United States Patent [19]

Ratté et al.

[11] 4,148,675

[45] Apr. 10, 1979

[54] INSULATION SYSTEM FOR ROCKET MOTORS

[75] Inventors: Jacques Ratté; Gonzague Duchesne, both of Ste-Foy; Pierre Carignan, Charlesbourg, all of Canada

[73] Assignee: Her Majesty the Queen in right of Canada, as represented by the Minister of National Defense, Ottawa, Canada

[21] Appl. No.: 898,189

[22] Filed: Apr. 20, 1978

Related U.S. Application Data

[63] Continuation-in-part of Ser. No. 660,790, Feb. 24, 1976, abandoned.

[30] Foreign Application Priority Data

Nov. 6, 1975 [CA] Canada ..................... 239113

[51] Int. Cl.² ................ B29C 24/00; F42B 15/00
[52] U.S. Cl. .................... 156/91; 102/103; 156/196; 156/286; 156/287; 156/294; 156/309; 156/313; 156/334
[58] Field of Search ........... 156/287, 294, 218, 214, 156/215, 91, 306, 313, 334, 309, 196, 286; 102/103

[56] References Cited

U.S. PATENT DOCUMENTS

| | | | |
|---|---|---|---|
| 3,152,029 | 10/1964 | Orloff | 156/91 |
| 3,943,208 | 3/1976 | Ratté et al. | 102/103 |
| 3,952,506 | 4/1976 | Macbeth | 102/103 |
| 3,961,476 | 6/1976 | Wasserman et al. | 102/103 |

FOREIGN PATENT DOCUMENTS

774310 7/1964 Canada.

Primary Examiner—Jerome W. Massie
Attorney, Agent, or Firm—Cushman, Darby & Cushman

[57] ABSTRACT

An insulation system for use in rocket motors containing solid composite propellants is disclosed. Some composite rocket propellants are based on carboxyl-terminated polybutadiene (CTPB) and others on hydroxyl-terminated polybutadiene (HTPB) binders. An important requirement of such systems is the ability of the wall insulation to adhere to the combustion chamber and of the composite propellant to adequately adhere to the insulation system. With CTPB propellants, a sheet insulant comprising chrysotile asbestos fibers and floats dispersed in a CTPB polymeric binder has been successfully employed. However, the use of a similar sheet insulant based on HTPB polymeric binder has not proved to be compatible with HTPB propellants. The present invention provides a composite sheet insulation system which is compatible with HTPB propellants including a first layer of sheet material comprising a CTPB binder having a mixture of asbestos fibers and floats dispersed in it and, bonded to it, a second layer of aluminum foil and an economical and effective method of lining a rocket casing propellant chamber, using the novel system of the present invention.

5 Claims, 1 Drawing Figure

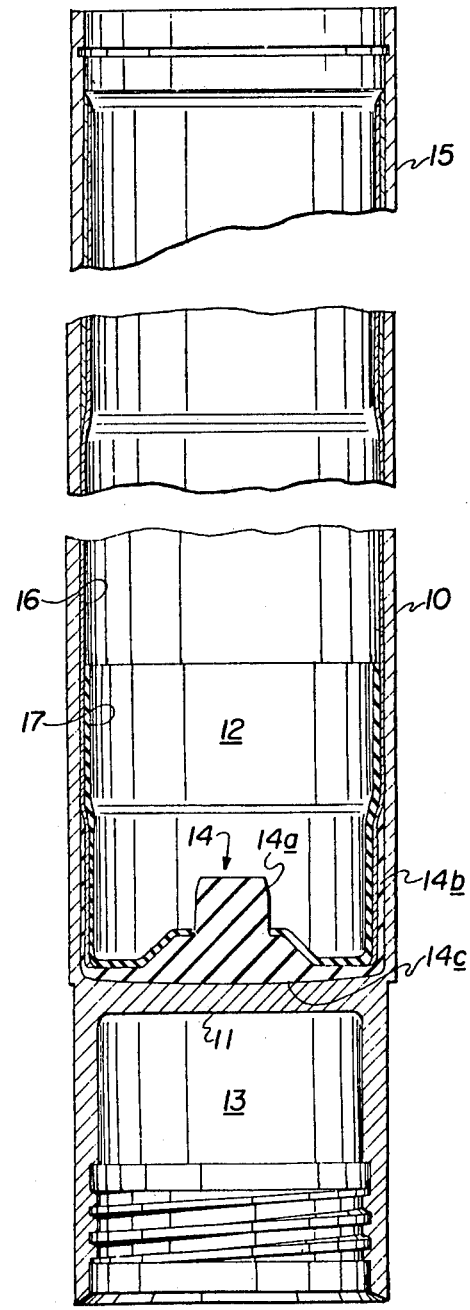

INSULATION SYSTEM FOR ROCKET MOTORS

CROSS-REFERENCE TO RELATED APPLICATION

This is a continuation-in-part of our application Ser. No. 660,790, filed Feb. 24, 1976, now abandoned.

BACKGROUND OF THE INVENTION

This invention relates to an insulation system and certain components thereof for use in rocket motors containing solid composite propellants.

In the construction of such rockets, the propellant is contained in a combustion chamber, which is separated from the forward compartment of the rocket by a bulkhead. The bulkhead is protected by a head-end insulator element and the combustion chamber walls are insulated with a suitable material. Some composite rocket propellants are based on carboxyl-terminated polybutadiene (CTPB) while others are based on hydroxyl-terminated polybutadiene (HTPB) binders. An important requirement of such rocket systems is the ability of the wall insulation to adhere to the combustion chamber and of the composite propellant to adequately adhere to the insulation system.

A sheet insulant which has been developed and successfully used with solid carboxyl-terminated polybutadiene (CTPB) propellant is a mixture of chrysotile asbestos fibers and floats dispersed in a CTPB polymeric binder, as taught in U.S. Pat. No. 3,943,208. The nature of this material will be described hereinafter in greater detail with reference to the specific description of the present invention.

A recent development in the art of solid rocket propellants is the introduction of hydroxyl-terminated polybutadienes (HTPBs), which have certain advantages over the CTPB propellants. With the advent of these propellants, it was hoped that HTPB insulant sheets could also be produced in the same manner as the CTPB sheets discussed above and having similar characteristics to the CTPB insulants, but which would be compatible with the HTPB propellants. Unfortunately, of a number of HTPBs tested, none provided insulant sheets which exhibited satisfactory shelf-life or bondability to the HTPB propellants.

It has therefore been an object of the present invention to provide a sheet insulant system which is a good thermal insulant and exhibits the necessary characteristics of bondability to HTPB systems.

Another object of the present invention is to provide an insulation process which will allow the positioning and bonding of the various insulating components to the rocket chamber in a single operation.

DETAILED DESCRIPTION OF THE INVENTION

We have found that the foregoing objects may be realized by employing a CTPB insulant as described above with an aluminum foil interposed between the insulant and the HTPB propellant. We have also found that by the practice of the present invention, the insulating components, i.e., the head-end insulator, the head-end restrictor, the nozzle-end collar (or doubler), the wall insulant and its aluminum lining may be positioned and bonded to the rocket chamber in a single operation.

Accordingly, in its method aspect the present invention includes bonding a composite sheet insulant system to a rocket propellant chamber casing in a single operation. The insulant system is composed of a layer of sheet material containing CTPB with asbestos fibers and floats dispersed in it and a layer of aluminum foil. To form the insulant system the CTPB sheet material is attached along only one longitudinal edge to a similar edge of the aluminum foil. The two layers are conveniently positioned then attached by staple means or the like running along the second edge. Care is taken at this juncture that the two layers are not bonded to each other.

Next the two layers are formed into a roll, the longitudinal edge attachment permitting any air that may be trapped between the two layers to be expelled due to the sliding of the two unbonded layers with respect to each other. The roll is inserted into the rocket propellant chamber and positioned so that CTPB layer is next to the casing and the aluminum foil is on the inside of the roll and defines a facing for the rocket chamber. Again relative movement between the two attached but unbonded layers and the rocket chamber allow for expulsion of substantially all of the air that may be trapped between the casing and either or both of the layers.

Heat and outward pressure are then applied from the axis of the cylinder to simultaneously bond the CTPB layer to the rocket casing and at the same time bond the aluminum foil layer to the CTPB layer. The resulting structure is virtually free from or completely free from air bubbles.

The invention will now be described further by way of example only and with reference to the single figure of the accompanying drawings, which is a cross-sectional view of a rocket casing including a side-wall insulant constructed in accordance with a preferred embodiment of the present invention.

EXAMPLE

In the following Example, a typical formulation and a method of producing CTPB sheeting for use in the insulant system of the present invention is described. A typical formulation of the insulating material is as follows:

a carboxyl-terminated polybutadiene polymer (e.g. HC-34 by Thiokol) — approx. 28.2%
an epoxide cure agent (e.g. ERLA-0510 by Union Carbide) — 1.5
a catalyst such as iron octasol — 0.3
reinforcing asbestos fibers (e.g. Grade 3Z12 asbestos by Johns-Manville) — 52.5
asbestos filler (e.g. asbestos floats Grade 7TF1 by Johns-manville). — 17.5

The processing of the CTPB insulant can be divided into three steps: (1) preliminary mixing, (2) first milling, and (3) final sheeting.

The preliminary mixing of the fibers, floats and binder is accomplished in a sigma-blade mixer at 140° F. The resulting elastomer-impregnated 'mass' or 'dough' is fairly stiff.

To be able to proceed with success through the first milling operation, the dough must be optimum consistency. It has been experimentally determined that for the 70 percent solids formulation, the dough is more easily milled after a two-hour aging at 160° F. The preliminary mixing is not sufficiently long to ensure full dispersion and wetting of the fibers. However, the partially cured dough receives further mixing when it is coverted into a blanket on the differential speed rolling mill.

The blanket is next fed to the final sheeting mill with the two rolls turning at an even speed. Five passes on the finishing mill yield a homogeneous, smooth and flexible sheet. The sheets are then cut to the required length, placed in polyethylene bags and normally stored at low temperature.

As hereinbefore described, the CTPB insulant sheeting per se is not novel and forms the subject of U.S. Pat. No. 3,943,208. The novel construction of the present invention is a combination of this sheeting with an aluminum foil layer to provide an insulant system for a rocket casing utilizing HTPB fuel.

BRIEF DESCRIPTION OF THE DRAWING

The FIGURE is a cross-section view of a rocket casing.

Before describing the method of applying the foil to the CTPB sheeting and the method of positioning and bonding the various insulating components to the casing in a single operation, the construction of a rocket casing employing the novel system of the present invention will be described. Thus, referring to the drawing, a metal rocket casing 10 is formed with a bulkhead 11 between the propellant chamber 12 and the forward compartment 13 of the rocket. A head-end insulator 14 is provided in the casing 10 and snugly abuts the bulkhead 11 and the adjacent regions of the inner casing wall. The head-end insulator is generally cup-shaped, with a central projection 14a extending into the propellant chamber 12 or a conical depression, as required. The annular wall 14b of the insulator adheres to the inner wall of the casing 10 and the base 14c of the insulator adheres to the bulkhead 11. A collar 15 is located adjacent the exit orifice of the chamber 12, the collar being roll-formed from the CTPB material.

A sidewall insulant laminate 16 of the CTPB/asbestos insulant and aluminum foil is provided around the inner wall of the propellant chamber 12 and extends over the wall 14b of the head-end insulator 14 and also over the collar 15. The aluminum foil is exposed to the contents of the chamber 12 and the insulant sheet contacts the metal casing 10. A head-end restrictor 17 is provided over a portion of the laminate 16 and the exposed inner surface of the insulator 14 but extending the central projection 14a. The restrictor 17 functions to limit the exposed propellant surface and is normally formed from a suitable elastomeric material which is compatible with the particular propellant being used in the rocket. Preferably, a release agent is located between the insulator 14 and the restrictor 17 to reduce the stress concentration at the head-end of the propellant grain during temperature cycling.

The installation procedure for the various components of the rocket propellant chamber is, according to a preferred embodiment of the invention, as follows. The CTPB sidewall insulant sheet, formed as described above, is laid on a clean surface and the collar 15 is positioned therebeneath at one end of the sheet. This collar is an additional layer of CTPB sidewall insulant which is located near the nozzle to overcome the local heating due to propellant erosion.

Aluminum foil is spread by hand on the insulant sheet and is stapled thereto at three or four locations along one longitudinal edge, to form the laminate 16. Fastened along one edge only, the laminate 16 allows air to be emitted when the laminate is next formed into a roll and the two sheets slide with respect to each other. During the pressurization process described below, the aluminum foil will adhere to the insulant sheet without the requirement for an adhesive.

An epoxy adhesive is brushed on the upper outside surface of the head-end restrictor 17, the balance of the outside surface having been covered with a release agent.

The restrictor 17 is positioned around the outer surface of an inflatable tubular rubber bag, adjacent one end thereof. The sidewall insulant sandwich is rolled around the rubber bag and the head-end restrictor 17. The insulator 14 is then capped on the sidewall insulant.

The above assembly is inserted into the casing and the rubber bag is inflated to 120 psi for one hour at 140° F., to press the various components together and against the casing sidewall, to which the components adhere without the requirement for an adhesive. Then the rubber bag is deflated and removed to yield the lined casing. The thus lined casing is then ready for propellant loading.

The present invention thus provides the rocket motor casing with a sidewall insulation, a laminate of CTPB sheet insulant and aluminum foil, which is suitable for bonding with HTPB with propellants. The invention also provides a rocket motor casing with all its insulating components positioned and bonded in a single operation.

Tensile tests were performed on a metal-CTPB insulant-aluminum foil-HTPB propellant system. The aluminum foil used was 0.001-inch thick. The method used was that described in the ICRPG Solid Propellant Mechanical Bahaviour Manual and known as the Bond-In-Tension Test. Specimens were aged at 140° F. for 0, 14, 28, 56 and 112 days and tested for failure at 73° F. and −50° F. Results are shown in Table I and all breaks were cohesive in the HTPB propellant.

Another test consisted of bonding aluminum foil to aged CTPB insulant. A fresh sheet of insulant was stored at room temperature and, every 7 days, a sample was taken and lined with aluminum foil. Tensile testing of these samples showed that all breaks were at the metal anvil-CTPB insulant interface, and that the failure stress values given in Table II correspond to the shelf-life of the CTPB insulant when stored at room temperature.

TABLE I

Failure Test on CTPB-Aluminum Lined and HTPB Propellant

| Aging Period at 140° F (days) | Failure Strength (psi)[1] Tensile Test Temperature | | | Propellant Strength at Break (psi)[2] |
|---|---|---|---|---|
| | 140° F | 73° F | −50° F | |
| 0 | 71.4 | 76.8 | 200 | 98 |
| 14 | — | 77.6 | 208 | 93 |
| 28 | — | 79.1 | 220 | 88 |
| 56 | — | 68.8 | 284 | 90 |
| 112 | — | 62.0 | 222 | — |

[1] At 0.2 in./min., crosshead speed, except for 0.5 in./min. at 56 days,
[2] at 2.0 in./min., crosshead speed.
Propellant Strength at 0.2 in./min. is normally 20% lower than at 2.0 in./min. at 73° F.
Failures were always cohesive in the propellant with a thick layer of propellant.

TABLE II

Bonding of Aluminum Foil to Aged CTPB Insulant Failure Testing at 75° F

| Aging Period of Insulant (days) | Failure Tensile Stress (psi) | |
|---|---|---|
| | Metal Anvil-Insulant-Al Foil | Metal Anvil-Insulant |
| 0 | 266 | 375 |
| 7 | 259 | 250 |
| 16 | 256 | 180 |
| 21 | 120 | 150 |
| 28 | 115 | 130 |

All breaks at the metal anvil-insulant interface.

In summary, according to the one-step method described above, it will be noted that during the pre-assembly of all the components outside of the rocket casing, the aluminum foil is not bonded to the sidewall insulant, but only mechanically attached to it, typically with three or four staples, along one of the two longitudinal edges. When rolled the other edge overlaps on top of the staples. This ensures that the metallic fasteners will not be in direct contact with the metallic wall of the rocket casing. The resulting structure provides that only the sidewall insulant is in contact with the casing for good adhesion during the pressurization step, while the aluminum foil on the inside surface of the insulated casing is present to prevent contact of the curative agent in the propellant (isocyanate) with the carboxyl-terminated polybutadiene insulant.

It is precisely because the aluminum foil does not adhere to the insulant prior to a certain degree of pressurization that the two components are free for sliding one on top of the other, therefore allowing air to escape through the aft end of the casing. For this reason, the early part of the pressurization with the rubber bag (0 to 20 psig) in practice is done slowly, usually in about 10–30 seconds. Using this procedure difficulties in eliminating air inclusions and preventing tearing of the foil during pressurization are avoided.

The method of the present invention is well suited for a small rocket casing being, say, less than six inches in diameter because the hand laying of the aluminum foil and the repairs after pressurization are impractical.

What is claimed is:

1. A method of bonding a composite sheet insulant system to a rocket propellant chamber casing in a single operation, said insulant system comprising:
(1) a first layer of a sheet material comprising a carboxyl-terminated polybutadiene binder and a mixture of asbestos fibers and floats dispersed therein; and
(2) a second layer of aluminum foil:
said method comprising:
(a) attaching, but not bonding, said layer of sheet material to said aluminum foil layer along only one longitudinal edge thereof,
(b) forming said insulant system into a roll and allowing said layer of sheet material and said aluminum foil layer to move relative to each other from the edge of their attachment thereby at least substantially eliminating air inclusions therebetween,
(c) inserting said roll into said chamber,
(d) positioning said insulant system in said chamber, said first layer in contact with said casing and the aluminum foil layer defining a facing for said chamber, and
(e) simultaneously bonding said first layer to said casing and to said aluminum foil in a single step by heating and applying outward pressure from the interior of said roll to force said insulant system against said casing.

2. The method of claim 1 wherein said sheet material is stapled to said aluminum foil layer along only one longitudinal edge thereof.

3. A method of bonding a composite sheet insulant system to a rocket propellant chamber casing in a single operation, said insulant system comprising:
(1) a first layer of a sheet material comprising a carboxyl-terminated polybutadiene binder and a mixture of asbestos fibers and floats dispersed therein, and
(2) a second layer of aluminum foil,
said method comprising:
(a) attaching, but not bonding, said layer of sheet material to said aluminum foil layer along only one longitudinal edge thereof,
(b) forming said insulant system into a roll,
(c) inserting said roll into said chamber,
(d) positioning said insulant system in said chamber, said first layer in contact with said casing and the aluminum foil layer defining a facing for said chamber, and
(e) simultaneously bonding said first layer to said casing and to said aluminum foil in a single step by heating and applying outward pressure from the interior of said roll to force said insulant system against said casing.

4. The method of claim 3 which further comprises forming a sub-assembly for insertion in said chamber, said sub-assembly including the rolled composite sheet insulant system, a head-end insulator and a head-end restrictor member, and
inserting and positioning said sub-assembly in said chamber, and
bonding said sub-assembly to said chamber by the action of said pressure and heat alone.

5. The method of claim 3 or 4 wherein said sheet material is stapled to said aluminum foil layer along only one longitudinal edge thereof.

* * * * *